United States Patent [19]

Ukon et al.

[11] Patent Number: 6,130,270

[45] Date of Patent: Oct. 10, 2000

[54] RADIATION-CURABLE RESIN COMPOSITION

[75] Inventors: Masakatsu Ukon, Ibaraki, Japan; Toshihiko Takahashi, Brussels, Belgium; Takashi Ukachi, Ibaraki, Japan

[73] Assignees: DSM N.V., Heerlen, Netherlands; JSR Corporation; Japan Fine Coatings Co., Ltd., both of Tokyo, Japan

[21] Appl. No.: 09/225,683

[22] Filed: Jan. 6, 1999

Related U.S. Application Data

[63] Continuation of application No. PCT/NL97/00388, Jul. 7, 1997.

[30] Foreign Application Priority Data

Jul. 8, 1996 [JP] Japan .................................. 8-177803

[51] Int. Cl.[7] .............................. G02B 1/04; G02B 1/12; C08F 2/48
[52] U.S. Cl. .......................... 522/182; 264/239; 264/1.32; 264/1.38; 264/1.7; 264/241; 522/121; 522/116; 522/33; 430/20; 428/1.1
[58] Field of Search ................................ 428/1.1; 430/20; 522/182, 121, 116, 33; 526/75, 318.1, 88, 318.4, 89; 264/239, 257, 331.11, 331.15, 1.32, 1.38, 1.7

[56] References Cited

U.S. PATENT DOCUMENTS

| | | | |
|---|---|---|---|
| 4,812,489 | 3/1989 | Watanabe et al. | 522/42 |
| 4,902,440 | 2/1990 | Takeyama et al. | 252/182.18 |
| 5,250,591 | 10/1993 | Fujii et al. | 523/521 |
| 5,932,625 | 8/1999 | Wantanabe et al. | 522/33 |

FOREIGN PATENT DOCUMENTS

| | | |
|---|---|---|
| 519 410 | 12/1992 | European Pat. Off. . |
| 109 073 | 5/1994 | European Pat. Off. . |

Primary Examiner—James J. Seidleck
Assistant Examiner—Sanza L. McClendon
Attorney, Agent, or Firm—Pillsbury Madison & Sutro

[57] ABSTRACT

A radiation curable composition comprising, (A) at least one compound containing a (meth)acrylate group represented by the following formula (1),

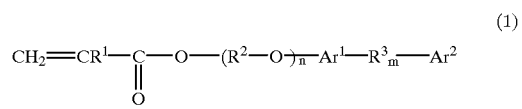

wherein $R^1$ is a hydrogen atom or a methyl group, $R^2$ is an alkylene group or a hydroxyalkylene group having 2 to 6 carbon atoms, $R^3$ is a divalent organic group, n is a number of 1 to 10, m is an integer of 0 or 1, and $Ar^1$ and $Ar^2$ are independently a group comprising an aromatic ring (B) at least one compound derived from trishydroxyethyl isocyanurate, and containing at least one (meth)acrylate group, and (C) at least one radiation polymerization initiator.

The radiation curable resin composition affords a high productivity, exhibits high transparency, and produces molded articles exhibiting minimal coloration upon exposure to light, superior dimensional precision, high heat resistance, only slight adhesion to substrates under high temperature conditions. The composition is very useful for manufacturing molding articles.

6 Claims, No Drawings

RADIATION-CURABLE RESIN COMPOSITION

This is a continuation of PCT/NL 97/00388 filed Jul. 7, 1997.

BACKGROUND OF THE INVENTION

1. Field of the Invention

The present invention relates to a radiation curable resin composition which is rapidly cured by irradiating ultraviolet light, and, more particularly, to a radiation curable resin composition applicable in the manufacture of optical parts such as lenses, optical disks, prisms, and lens sheets which are molded by polymerization in dies. The resin composition is also suitable for use as a surface coating material of plastic film substrates used for optical materials such as substrates for a liquid crystal display element.

2. Description of Related Art

A method for manufacturing plastic lenses and the like by irradiating a UV curable resin with ultraviolet light from a mercury lamp as an activated energy ray has been proposed (Japanese Patent Applications Laid-open No. 194401/1986, No. 207632/1988). According to this method, although there is an advantage that the resin is cured in a short period of time by irradiation of ultraviolet light, transparency and the color of the lens produced by curing with irradiation of ultraviolet light are generally inferior in comparison with those produced from a polymer such as polymethyl methacrylate, polycarbonate, or diethylene glycol bisarylcarbonate. In addition, coloration of the molded products upon exposure to ultraviolet light is a problem, moreover, in the molding by polymerization in dies of conventional UV curable resins, a distortion at the time of curing tends to remain in the molded product after molding, so that the molded product may warp or shrink after the product has been removed from the die, impairing the dimensional accuracy of the product.

Japanese Patent Application Laid-open No. 174910/1995 proposes a prism sheet which increases front brightness of a back light unit which is used in liquid crystal display equipment. This prism sheet is molded in a specific shape from a transparent material with of a specific refractive index. As the methods for producing the prism sheet, the patent discloses a method for integrated molding using a transparent glass possessing a refractive index of a specific range and a method for molding a prismatic shape from a UV curable resin composition.

As admitted by the Japanese Patent Application Laid-open No. 174910/1995, plastic materials represented by these UV curable resins can be used only limitedly to the applications requiring heat resistance. In other words, if a lens sheet typified by the prism sheet obtained from a conventional UV curable resin is used in a high temperature environment, a part of the lens sheet fuses on the surface of the back light and leaves a sticking scar. This is a fatal drawback affecting the optical performance of the products.

In addition, from the viewpoint of making thinner and larger liquid crystal cells having a curved display surface, attention is given to the liquid crystal display element using a plastic film as a substrate instead of the conventional glass substrate. However, when a plastic film is used as a substrate, the external surface of the substrate is easily damaged, impairing the external appearance and inviting occurrence of irregular reflection due to the wound. The optical characteristics of the liquid crystal display element is thus adversely affected. For this reason, a coating layer of a UV curable resin is provided onto the surface of the substrate to increase the hardness of the substrate surface, thereby obtaining a liquid crystal display element of which the surface is damaged only with difficulty.

However, if said coating layer is formed using a conventional UV curable resin, the resulting image is dark and poor as compared with those obtained from the liquid crystal display element using a glass substrate due to insufficient transparency, coloration resulting from exposure to light, and the like.

The present invention has been completed in view of these drawbacks in conventional technology and has an object of providing a radiation curable resin composition suitable for molding, which exhibits a high productivity and high transparency, and can produce molded products with a high refractive index, high surface hardness, minimal coloration due to exposure to lights, excellent dimensional precision, superior heat resistance, and freedom from adhesion to the surface in a high temperature environment.

SUMMARY OF THE INVENTION

The above object of the present invention has been achieved in the present invention by the provision of a radiation curable composition comprising, (A) at least one compound containing a (meth)acrylate group represented by the following formula (1),

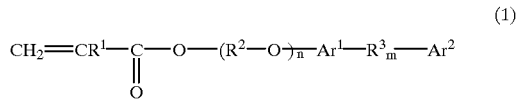

(1)

wherein $R^1$ is a hydrogen atom or a methyl group, $R^2$ is an alkylene group or a hydroxyalkylene group having 2 to 6 carbon atoms, $R^3$ is a divalent organic group, n is a number of 1 to 10, m is an integer of 0 or 1, and $Ar^1$ and $Ar^2$ are an independently aromatic ring comprising group, (B) at least one compound comprising a (tri)-thylisocyanurate, an further comprising at least one meth)acrylate group, and (C) at least one radiation polymerization initiator

DETAILED DESCRIPTION OF THE INVENTION AND PREFERRED EMBODIMENTS

Component (A) is at least one compound containing a (meth)acrylate group, represented by formula (1) and which comprises two aromatic groups, one of which is connected to the one (meth)acrylate group via an alkylene or hydroxyalkylene group. Preferred examples of these (hydroxy)alkylene groups include 1,2-ethylyl, 1,3-propylyl, 1,2-propylyl, 1,4-butylyl, 1,2-butylyl, 1,4-pentylyl, 1,4-(2-methyl)-butylyl, 1,5-pentylyl and 2-hydroxy-1,3-propylyl.

In particular, 1,2-ethylyl, 1,2-propylyl, 1,4-butylyl, 1,2-butylyl, 1,4-(2-methyl)-butylyl or 2-hydroxy-1,3-propylyl are preferred.

Preferably, the number of alkoxy groups is in the range of 1–5, and more preferably 1–3.

In case the two phenyl groups are bound to each other via a bridging group, this bridging group preferably is a 2,2'-propylyl, 2,2'-hexafluoropropylyl, methylyl or sulphoxo group. Of these, 2,2'-propylyl is particularly preferred.

Examples of the compound of the formula (1), when m is 1 in that formula, include (meth)acrylic acid ester of ethylene oxide addition p-cumylphenol and (meth)acrylic acid ester of propylene oxide addition p-cumylphenol. These compounds can be obtained by the addition reaction of ethylene oxide or propylene oxide to p-cumylphenol, followed by the reaction of the resulting compound with (meth)acrylic acid. Among these, especially preferred is (meth)acrylic acid ester of ethylene oxide addition p-cumylphenol. Aronix M110 (manufactured by Toagosei Chemical Industry Co., Ltd.) can be given as an example of the commercially available product which can be used.

Examples of the compound when m is 0 in the formula (1), include 2-hydroxy-3-(O-phenylphenoxy)propyl acrylate, 2-(O-phenylphenoxy)ethyl acrylate, 2-[2-(O-phenylphenoxy)-ethoxy]ethyl acrylate, and the like can be given. These compounds can be obtained by the addition reaction of alkylene oxide to phenylphenol, followed by the reaction with (meth)acrylic acid. TO-1317 (manufactured by Toagosei Chemical Industry Co., Ltd.) can be used as an example of the commercially available product.

The amount of the component (A) in the composition of the present invention is usually 10 to 70 wt %, preferably 10 to 60 wt %, and more preferably 10 to 50 wt %. The wt % in this application is defined as to be in respect to the total of the composition, unless otherwise stated. A cured product with a suitable refractive index and excellent heat resistance can be obtained by incorporating the component (A) in an amount in this range.

At least one (meth)acrylate group-containing compound that comprises trisethyl isocyanurate is used as component (B) in the composition of the present invention. The trisethylisocayanurate is derived from trishydroxyethyl isocyanurate. The (meth)acrylate group can be directly bound to the alkylgroup of the hydroxylkyl of the hydroxy-ethylisocyanurate, or through a hydroxy-acid like a ring-opened caprolactone.

Preferably, at least one of the (meth)acrylate groups is bound directly to the alkyl of the hydroxyalkyl-isocyanurate because the cross-link density of the cured products, and the characteristics, are thereby optimized.

Preferably, one group or—on average—less than one of the hydroxy alkyl groups, remains unreacted; hence, the (meth)acryl functionality of the compound preferably is at least about 2, and may be three. If on average the (meth) acryl functionality of this compound is one or less, the crosslink density of the cured products becomes relatively low.

The proportion of this component (B) in the composition is usually 10 to 70 wt %, and preferably 30 to 60 wt %. If this proportion is less than 10 wt %, hardness and mar resistance of the cured products may be impaired; if more than 70 wt %, shrinkage at the time when the resulting composition is cured may be sometimes large.

TEICA (manufactured by Daiichi Kogyo Seiyaku Co., Ltd.), FA731A (manufactured by Hitachi Chemical Co., Ltd.), Aronix M215, M315, M325 (manufactured by Toagosei Chemical Industry Co., Ltd.), and the like can be given as examples of commercially available products of this compound.

Any compound may be used as the radiation polymerization initiator of the component (C) in the present invention, so long as such a compound can decompose by irradiation, produce a radical, and initiate polymerization. Optionally, a photosensitizer can be used with the component (C). The radiation here includes radiation such as, for example, infrared light, visible light, ultraviolet light, X-rays, electron beams, α-rays, βrays, and γ-rays. Ultraviolet light is preferred among these.

Examples of the radiation polymerization initiators include acetophenone, acetophenone benzyl ketal, anthraquinone, 1-hydroxycyclohexylphenyl ketone, 2,2-dimethoxy-2-phenylacetophenone, xanthone compounds, triphenylamine, carbazole, 3-methylacetophenone, 4-chlorobenzophenone, 4,4'-dimethoxybenzophenone, 4,4'-diaminobenzophenone, 2-hydroxy-2-methyl-1-phenylpropan-1-one, 1-(4-isopropylphenyl)-2-hydroxy-2-methylpropan-1-one, carbazole, xanthone, 1,1-dimethoxy-deoxybenzoin, 3,3'-dimethyl-4-methoxybenzophenone, thioxanethone compounds, diethylthioxanthone, 2-isopropylthioxanthone, 2-chlorothioxanthone, 1-(4-dodecylphenyl)-2-hydroxy-2-methylpropan-1-one, 2-methyl-l-[4-(methylthio)phenyl]-2-morpholinopropan-1-one triphenylamine, 2,4,6-trimethylbenzoyl diphenylphosphine oxides, bis-(2,6-dimethoxybenzoyl)-2,4,4-trimethylpentyl phosphine oxides, bisacylphosphine oxide, benzyl methyl ketal, 1-hydroxycyclohexylphenyl ketone, 2-hydroxy-2-methyl-1-phenylpropan-1-one, fluorenone, fluorene, benzaldehyde, benzoin ethyl ether, benzoin propyl ether, benzophenone, Michler's ketone, 2-benzyl-2-dimethylamino-1-(4-morpholinophenyl)-butan-1-one, 3-methylacetophenone, and 3,3',4,4'-tetra(t-butyl peroxycarbonyl)benzophenone (BTTB).

In addition, a coloring sensitizer, such as xanthene, thioxanthene, cumarin, and ketocumarin, can be used with component (C).

Moreover, the compound which is represented by the following formula (2) can be used.

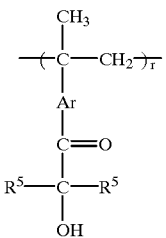

(2)

In the formula (2), $R^4$ and $R^5$ individually represent an alkyl group having 1 to 5 carbon atoms, specifically, methyl group, ethyl group, n-propyl group, i-propyl group, n-butyl group, t-butyl group, n-pentyl group, or i-pentyl group. Of these groups, alkyl groups having 1 to 3 carbon atoms are preferred. The symbol r in the above formula indicates a number of 2 to 50, and preferably 2 to 20.

Among these compounds, benzyl methyl ketal, 1-hydroxycyclohexylphenyl ketone, 2,4,6-trimethylbenzoyl diphenylphosphine oxides, bis-(2,6-dimethoxybenzoyl)-2,4, 4-trimethylpentyl phosphine oxides, 2-benzyl-2-dimethylamino-1-(4-morpholinophenyl)-butan-1-one, and the like are particularly preferred.

Irgacure 184, 651, 500, 907, 369, 784, 2959 (manufactured by Ciba Geigy), Lucirin TPO (manufactured by BASF), Darocur 1116, 1173 (manufactured by Merck Co.), Ubecryl P36 (manufactured by UCB Co.), ESCACURE KIP150, ESCACURE KIP100F (manufactured by Lamberti Co.), and the like can be given as examples of commercially available products.

Examples of the photosensitizers include triethylamine, diethylamine, N-methyldiethanoleamine, ethanolamine, 4-dimethylaminobenzoic acids, 4-methyl dimethylaminobenzoate, 4-ethyl dimethylaminobenzoate, 4-isoamyl dimethylaminobenzoate, and commercially available products such as Ubecryl P102, 103, 104, 105 (manufactured by UCB Co.), and the like.

The amount of the foregoing radiation polymerization initiators added to the composition of the present invention as the component (C) is usually 0.01 to 10 wt %, preferably 0.5 to 7 wt %, and particularly preferably 1 to 5 wt %. An amount of component (C) exceeding 10 wt % may adversely affect the storage stability of the composition and the characteristics of cured products. If this amount is less than 0.01 wt %, the curing rate may be reduced.

Beside the above-mentioned component (A) and component (B), it is possible to use a polymerizable monomer which contains a vinyl group or a (meth)acrylate group as an optional component in the present invention. Such a polymerizable monomer may be either a mono-functional monomer or a poly-functional monomer.

Examples of the mono-functional monomer include vinyl group containing monomers such as for example N-vinyl caprolactam, N-vinyl pyrrolidone, N-vinylcarbazole, N-vinyl formamide, vinyl pyridine; and (meth)acryl group comprising monomers such as for example acrylamide, acryloyl morpholine, 7-amino-3,7-dimethyloctyl (meth)acrylate, isobutoxymethyl (meth)acrylamide, isobornyloxyethyl (meth)acrylate, isobornyl (meth)acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl (meth)acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, phenoxyethyl (meth)acrylate, butoxyethyl (meth)acrylate, pentachlorophenyl (meth)acrylate, pentabromophenyl (meth)acrylate, polyethylene glycol mono(meth)acrylate, polypropylene glycol mono(meth)acrylate, bornyl (meth)acrylate, methyltriethylene diglycol (meth)acrylate, and (meth)acrylate group-containing monomers represented by the following formula 3–6

$$CH_2=C(R^6)COO(R^7O)_m(R^8) \quad (3)$$

wherein $R^1$ is a hydrogen atom or a methyl group, $R^7$ is an alkylene group having 2 to 6, preferably 2 to 4, carbon atoms, $R^8$ is a hydrogen atom or an alkyl group having 1 to 12, preferably 1 to 9, carbon atoms, and m is an integer from 1 to 12, preferably 1 to 8;

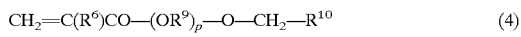

$$CH_2=C(R^6)CO-(OR^9)_p-O-CH_2-R^{10} \quad (4)$$

wherein $R^6$ has the same meaning as defined for formula (3), $R^9$ is an alkylene group having 2 to 8, preferably 2 to 5, carbon atoms; $R^{10}$ is a tetrahydrofuryl group, and p is an integer from 1 to 8, preferably 1 to 4;

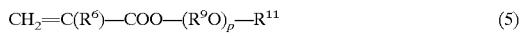

$$CH_2=C(R^6)-COO-(R^9O)_p-R^{11} \quad (5)$$

wherein $R^6$, $R^9$, and p have the same meanings as defined above, $R^{11}$ is a phenyl group, optionally substituted with an alkyl group having 1 to 12, preferably 1 to 9, carbon atoms; and

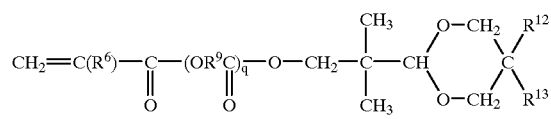

(6)

wherein $R^6$ and $R^9$ have the above defined meaning and q is an integer from 0 to 8; and $R^{12}$ and $R^{13}$ are individually a hydrogen atom, an alkyl group containing 1 to 6 carbon atoms, a group —$R^{14}$—A, wherein $R^{14}$ is an alkylene group containing 1 to 6 carbon atoms and A is a (meth)acrylateoxy group.

Of these, N-vinyl caprolactam, N-vinyl pyrrolidone, acryloyl morpholine, N-vinylcarbazole, isobornyl (meth)acrylate, phenoxyethyl (meth)acrylate, and the like are preferred. Particularly preferred among these are N-vinyl caprolactam, N-vinyl pyrrolidone, and acryloyl morpholine. Acryloyl morpholine is an ideal mono-functional monomer.

Examples of commercially available products of these mono-functional monomers include Aronix M-111, M-113, M-117 (manufactured by Toagosei Chemical Industry Co., Ltd.), KAYARAD TC110S, R-629, R-644 (manufactured by Nippon Kayaku Co., Ltd.), and Viscoat 3700 (manufactured by Osaka Organic Chemical Industry, Ltd.).

Examples of the poly-functional monomers include (meth)acrylate group containing monomers, such as ethylene glycol di(meth)acrylate, dicyclopentenyl di(meth)acrylate, triethylene glycol diacrylate, tetra ethylene glycol di(meth)acrylate, tricyclodecanediyl-dimethylene di(meth)acrylate, trimethylolpropane tri(meth)acrylate, trimethylolpropane trioxyethyl (meth)acrylate, tripropylene diacrylate, neopentyl glycol di(meth)acrylate, both terminal (meth)acrylic acid ester of ethylene oxide addition bisphenol A, both terminal (meth)acrylic acid ester of propylene oxide addition bisphenol A, both terminal (meth)acrylic acid ester of ethylene oxide addition tetrabromobisphenol A, both terminal (meth)acrylic acid ester of propylene oxide addition tetrabromobisphenol A, both terminal (meth)acrylic acid addition products of bisphenol A diglycidyl ether, both terminal (meth)acrylic acid addition products of tetrabromo bisphenol A diglycidyl ether, 1,4-butanediol di(meth)acrylate, 1,6-hexanediol di(meth)acrylate, pentaerythritol tri(meth)acrylate, pentaerythritol tetra(meth)acrylate, polyester di(meth)acrylate, and polyethylene glycol di(meth)acrylate.

Among these, the both terminal (meth)acrylic acid ester of ethylene oxide addition bisphenol A, both terminal (meth)acrylic acid ester of propylene oxide addition bisphenol A, tricyclodecanediyldimethylene di(meth)acrylate, tetraethylene glycol di(meth)acrylate, tripropylene glycol (meth)acrylate, neopentyl glycol di(meth)acrylate, polyethylene glycol di(meth)acrylate are particularly preferred.

Yupimer UV, SA1002 (manufactured by Mitsubishi Chemical Co., Ltd.), Viscoat 700 (manufactured by Osaka Organic Chemical Industry, Ltd.), KAYARAD R-604, DPCA-60, DPCA-30, DPCA-120, HX-620, D-310, D-330 (manufactured by Nippon Kayaku Co., Ltd.), Aronix M-210 (manufactured by Toagosei Chemical Industry Co., Ltd.), and the like can be given as commercially available products of the poly-functional monomer.

The above-mentioned polymerization monomers can be used either individually or in combination of two or more, in an amount of preferably 40 wt % or less, and particularly preferably 30 wt % or less. If this amount is more than 40 wt %, a rate of curing shrinkage of cured products increases and the refractive index may decrease.

In addition to the above components, various additives can be optionally added to the composition of the present invention. Such additives include, for example, antioxidants, UV absorbers, photostabilizers, silane coupling agents, aging preventives, thermal polymerization inhibitors, coloring agents, leveling agents, surfactants, preservatives, plasticizers, lubricants, solvents, inorganic fillers, organic fillers, fillers, wettability improvers, and coating surface improvers.

Examples of the commercially available antioxidants include Irganox 1010, 1035, 1076, and 1222 (manufactured by Ciba Geigy). Examples of commercially available UV absorbers include Tinuvin P, 234, 320, 326, 327, 328, 213, 400 (manufactured by Ciba Geigy) and Sumisorb 110, 130, 140, 220, 250, 300, 320, 340, 350, 400 (manufactured by Sumitomo Chemical Industries Co., Ltd.). Commercially available products of the photostabilizers include Tinuvin292, 144, 622LD (manufactured by Ciba Geigy), Sanol LS-770, 765, 292, 2626, 1114, 744 (manufactured by Sankyo Chemical Co.), and the like. Examples of the silane coupling agents include γ-aminopropyltriethoxysilane, γ-mercaptopropyltrimethoxysilane, γ-acryloxypropyltrimethoxysilane, and commercially available products such as SH6062, SZ6030 (manufactured by Toray-Dow Corning Silicone Company), and KBE903, KBM803 (manufactured by Shin-Etsu Silicone Co., Ltd.). Examples of commercially available products of the aging preventives include Antigene W, S, P, 3C, 6C, RD-G, FR, and AW (manufactured by Sumitomo Chemical Industries Co., Ltd.).

Beside the above-described components, other polymerizable compounds, polymers, or oligomers may be incorporated as other additives to the composition of the present invention. Such polymerizable compounds, polymers, or oligomers include, for example, epoxy resin; polymerizable compounds such as urethane (meth)acrylate, vinyl ether, propenyl ether, and maleic acid derivatives; polyamide, polyimide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine-containing oligomer, silicon-containing oligomer, and polysulfide oligomer.

The radiation curable resin composition of the present invention can be prepared by mixing the above-mentioned components by a conventional means. The viscosity of the composition of the present invention thus prepared may be adjusted in the range usually of 100 to 20,000 cps/25° C., and preferably of 500 to 10,000 cps/25° C.

When the radiation curable resin composition of the present invention is cured, a cured product having a Youngs modulus in the range of 1 to 250 kg/mm$^2$ at 23° C. is obtained. The refractive index (25° C.) of the cured product is preferably 1.54 or more, and more preferably 1.55 or more; and the amount of shrinkage accompanied by the curing of the composition is preferably less than 10%, and more preferably less than 6%.

EXAMPLES

The present invention will be hereinafter described in more detail by way of examples which are given for illustration of the present invention and shall not to be construed as limiting the present invention.

Examples 1–6 and Comparative Examples A–D

The components with the composition shown in Table 1 were charged into the reaction vessel equipped with a stirrer and stirred for three hours which controlling the liquid temperature at 50 to 60° C. to obtain uniformly blended resin compositions. The resin compositions were used for the following tests.

In Table 1 the numerals for the compositions in Examples 1–6 and Comparative Examples A–D indicate part(s) by weight.

Test Examples

Test specimens were prepared from the resin compositions obtained in the above Examples and Comparative Examples to evaluate the viscosity, refractive index, pencil hardness, cure shrinkage, resistance to coloration on exposure to light, and substrate adhesion at high temperatures. The results are shown in Table 2.

Measurement of viscosity:

The viscosity at 25° C. was measured according to JIS K7117 using a rotation viscometer.

Preparation of test specimens:

The resin composition was applied to a glass plate to a thickness of about 200 μm using a 15 μm applicator bar and ultraviolet light at a dose of 1.0 J/cm$^2$ was irradiated under an air atmosphere, to obtain a cured film. The cured film was peeled off from the glass plate and aged at 23° C. and a relative humidity of 50% for 24 hours to obtain test specimens.

Measurement of refractive index:

The refractive indexes of the test specimens at 25° C. were measured using an Abbes refractometer.

Measurement of pencil hardness:

The pencil hardness was measured according to JIS K5400 using a pencil scraping tester.

Measurement of cure shrinkage:

The composition was applied to a PET film with a thickness of 120 μm using a 250 μm applicator bar, followed by irradiation of UV light at a dose of 1.0 J/cm$^2$ in the air. The PET film was cut into 10 cm squares and the the four corners was measured by a caliper. The average of the warpages at the four corners was determined. The samples for which the average was less than 10 mm was deemed acceptable (indicated as o) and those for which the average was 10 mm or greater was deemed unacceptable (indicated as X).

Resistance to coloration upon exposure to light:

A cured test specimen with a thickness of 100 μm was prepared by applying the composition to a glass sheet using a 250 μm applicator bar, followed by irradiation of UV light at a dose of 1.0 J/cm$^2$ in the air. The test specimen was subjected to a UV light exposure test for 7 days using a photoresistant tester (QUV, manufactured by Q-Panel Co.). The color difference (ΔE) of the test specimen was measured using a color differentiometer (CR-300, manufactured by Minolta Camera Co., Ltd.) using a standard white board as a standard. The samples for which the ΔE was less than 10 was deemed acceptable (indicated as o) and those for which the ΔE was 10 or greater was deemed unacceptable (indicated as X).

Substrate adhesion at high temperatures:

The resin composition was charged into a die for a prism sheet having irreguralities. A sheet of transparent polyethylene terephthalate (PET) with a thickness of 125 μm was adhered to the composition. UV light was irradiated from the side of the PET film at a dose of 1.0 J/cm$^2$ to obtain a cured film. Five sheets of this cured film, cut into 5 mm×50 mm each, were arranged on a glass plate at an interval of 5 mm. An acrylic plate with a thickness of 2 mm was put on the sheets of the cured film. The sample was placed in a thermostat at 100° C. for one hour with a load of 20 g/cm$^2$ imposed over the acrylic plate. Then, the acrylic plate was removed to observe the portion which was in contact with the test specimens to examine if there was a scar left by the adhesion of the test specimens. The samples without a scar was indicated as o, and those with a scar as X.

TABLE 1

<Resin compositions used for Examples and Comparative Examples>

|   | Example |   |   |   |   |   | Comparative Example |   |   |   |
|---|---|---|---|---|---|---|---|---|---|---|
|   | 1 | 2 | 3 | 4 | 5 | 6 | A | B | C | D |
| a | 30 |   |   |   |   |   |   |   |   |   |
| b |   | 30 | 30 | 30 | 30 | 30 |   | 30 | 50 | 50 |
| c |   |   |   |   |   |   | 30 |   |   |   |
| d | 50 | 50 | 50 | 50 |   |   | 50 |   |   |   |
| e |   |   |   |   | 50 |   |   |   |   |   |
| f |   |   |   |   |   | 50 |   | 50 |   |   |
| g | 20 | 20 |   |   | 20 | 20 | 20 | 20 |   | 50 |
| h |   |   | 20 |   |   |   |   |   |   |   |
| i |   |   |   | 20 |   |   |   |   |   |   |
| j |   |   |   |   |   |   |   |   | 50 |   |
| k | 3 |   | 3 | 3 |   | 3 | 3 | 3 | 3 | 3 |
| l |   | 4 |   |   |   |   |   |   |   |   |
| m |   |   |   |   | 2 |   |   |   |   |   | a: Acrylic acid ester of ethylene oxide addition p-cumylphenol (in formula (1), n = 1)
b: 2-Hydroxy-3-(o-phenylphenoxy)propyl acrylate
c: Phenoxyethyl acrylate
d: Trishydroxyethyl isocyanurate triacrylate
e: Trishydroxyethyl isocyanurate diacrylate
f: Caprolactone denatured dihydroxyethyl isocyanurate triacrylate (one mole of caprolactone reacted with one mole of trishydroxyethyl isocyanurate)
g: Acryloyl morpholine
h: N-vinyl pyrrolidone
i: N-vinyl caprolactam
j: Trimethylolpropane triacrylate
k: 1-Hydroxycyclohexyl phenylpropanone
l: Oligo 2-hydroxy-2-methyl-1-[4-(1-methylvinyl)phenyl]propan-1-one
m: 2,4,6-Trimethylbenzoyldiphenylphosphine oxide

TABLE 2

|   | Example |   |   |   |   |   | Comparative Example |   |   |   |
|---|---|---|---|---|---|---|---|---|---|---|
|   | 1 | 2 | 3 | 4 | 5 | 6 | A | B | C | D |
| Viscosity cps/25° C. | 1100 | 2500 | 1100 | 1200 | 1500 | 2200 | 400 | 600 | 4800 | 300 |
| Refractive index | 1.552 | 1.560 | 1.557 | 1.558 | 1.559 | 1.556 | 1.542 | 1.545 | 1.569 | 1.560 |
| Pencil hardness | 3H | 3H | 2H | 2H | 2H | 2H | HB | 4H | H | B |
| Cure shrinkage | ○ | ○ | ○ | ○ | ○ | ○ | ○ | X | X | ○ |
| Resistance to coloration on exposure to light | ○ | ○ | ○ | ○ | ○ | ○ | ○ | ○ | ○ | X |
| Substrate adhesion at high temperatures | ○ | ○ | ○ | ○ | ○ | ○ | X | ○ | X | X |

The radiation curable resin composition of the present invention not only has an excellent curability and affords a high productivity in the manufacture of molded articles, but also exhibits an extremely low cure shrinkage which ensures superior dimensional precision. In addition, the composition produces molded products with a high transparency, high surface hardness, and minimal coloration upon exposure to light.

Moreover, the composition adheres only slightly to substrates under high temperature conditions. The radiation curable resin composition is very useful as a surface coating material of plastic materials used for optical parts such as substrates of liquid crystal elements, as well as a coating material for woods, plastics, metals, glasses, and ceramics.

What is claimed is:

1. A molded product, which comprises a cured composition comprising, prior to cure:

(A) at least one compound containing a (meth)acrylate group represented by the following formula (1),

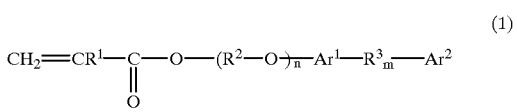

$$CH_2=CR^1-\underset{O}{\overset{\parallel}{C}}-O-(R^2-O)_n-Ar^1-R^3_m-Ar^2 \quad (1)$$

wherein $R^1$ is a hydrogen atom or a methyl group, $R^2$ is an alkylene group or a hydroxyalkylene group having 2 to 6 carbon atoms, $R^3$ is a divalent organic group, n is a number of 1 to 10, m is an integer of 0 or 1, and $Ar^1$ and $Ar^2$ are independently an aromatic ring comprising group;

(B) at least one compound comprising tris-ethyl isocyanurate, and containing at least one (meth)acrylate group; and (C) at least one radiation polymerization initiator.

2. A product according to claim 1, wherein the product is an optical part.

3. A product according to claim 1, wherein the product comprise a lens, disk, prim or lens sheet.

4. A product according to claim 1, wherein the product has a Youngs modulus in the range of 1–250 kg/mm² at 23° C.

5. A product according to claim 1, wherein the product has a refractive index at 25° C. of 1.54 or more.

6. A product according to claim 1, wherein the shrinkage accompanied by curing of the composition is less than 10%.

* * * * *